United States Patent Office 3,064,820
Patented Nov. 20, 1962

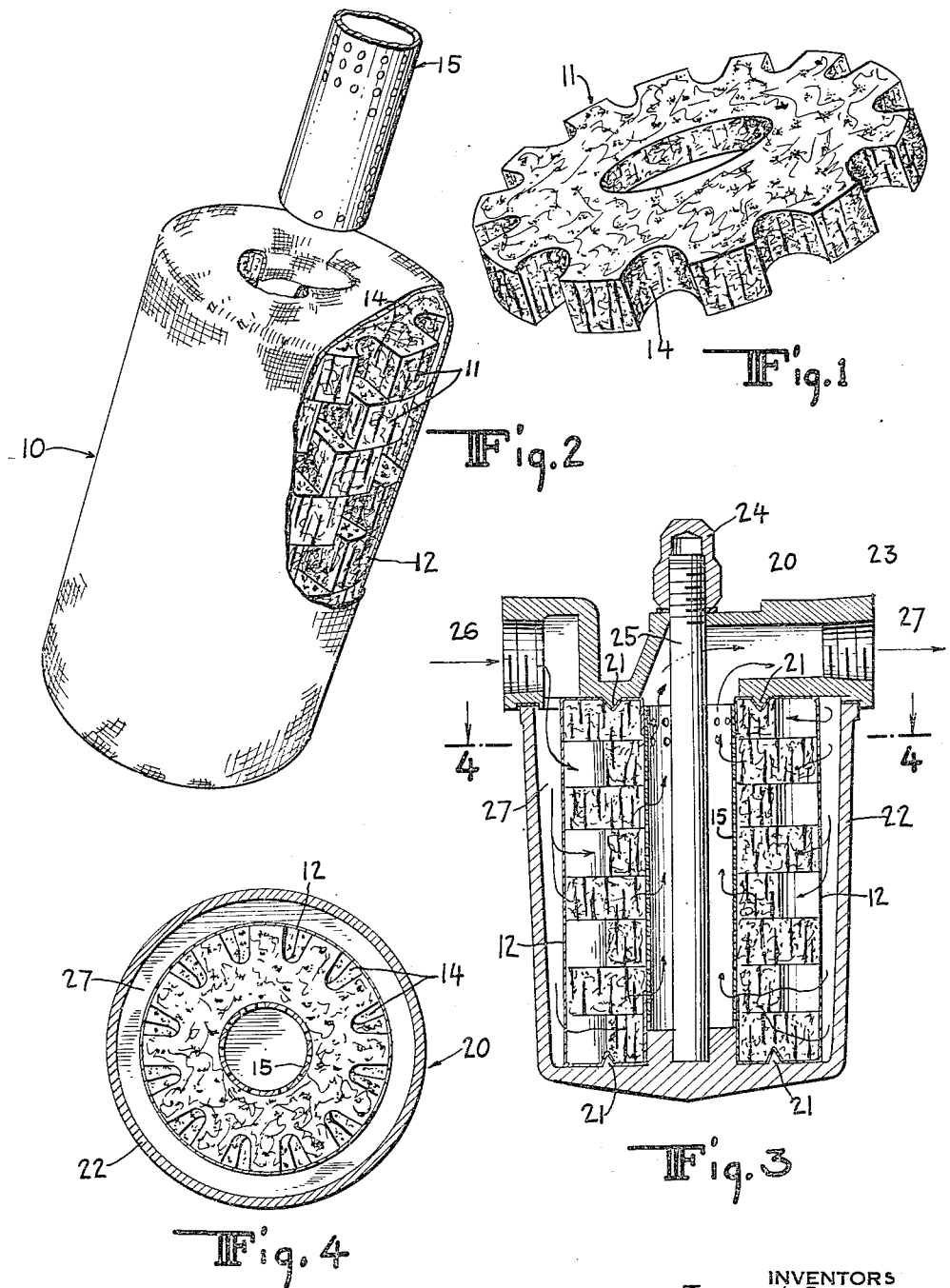

3,064,820
FILTER CARTRIDGES
Thomas J. Gillick, Jr., Norwalk, and Arthur C. Wrotnowski, Greenwich, Conn., assignors to American Felt Company, Glenville, Conn., a corporation of Massachusetts
Filed June 27, 1958, Ser. No. 745,204
3 Claims. (Cl. 210—488)

This invention relates to cartridges for cartridge type filters.

Many attempts have been made in the past to provide a wholly satisfactory and economical cartridge for use as original equipment, or as refills, for cartridge filters. For the most part, one has been limited to a choice between simple and inexpensive, but inefficient, cartridges and complicated and expensive, but more efficient, cartridges. For example, ordinary fibrous batts or carded fibrous batts, constitute the simplest and cheapest materials for use in filter cartridges, but such materials are usually low in efficiency. Woven fabric, fibrous materials bonded with synthetic resins, filtration elements with varying porosity along the path of the flow of the fluid being filtered, and various types of fibrous filter elements of very complicated design have been suggested as a means for improving the efficiency of cartridge filters. All such proposed solutions have added substantially to the cost of the cartridges, but have not always, or even usually, provided compensating advantages. Furthermore, they become clogged relatively soon when in use and must be replaced with more frequency than is desired.

It is an important object of this invention to provide a cartridge for filters which is simple in design, inexpensive, and highly efficient, particularly in the range for which designed.

It is another object of this invention to provide a cartridge for filters of greatly increased capacity and life.

It is yet another object of this invention to provide a cartridge filter element having predeterminable filtration capacity.

It is still another object of this invention to provide a cartridge for cartridge filters which will operate successfully at exceptionally low internal pressure differentials.

It is a further object of this invention to provide a cartridge for cartridge filters having unusual compressional resilience.

In one aspect of the invention, the advantages mentioned above are obtained by providing a filter cartridge composed of a stack, or pile, or ring-like non-woven fibrous material, namely, mechanically interlocked felt. It is to be understood that "ring-like" includes generally cylindrical, elliptical, rectangular or other shaped discs. The felt is prepared in a known manner in a carding machine and then the fibers are mechanically interlocked by subjecting the batt to a needling operation by passing barbed needle means repeatedly through the thickness of the batt in such a manner as to cause the fibers to move in a depthwise direction or across the layers of the fibers of the batt, such depthwise located fibers being substantially perpendicular to the faces of the discs or generally ring-like elements. As the needles are withdrawn, the fibers will remain in their depthwise position where they have been carried so as to produce a mechanical interlocking of the fibers. The mechanical interlocking may be achieved by subjecting either one or both sides of the batt to the needling treatment. The stack may be encased in a permeable or foraminous cover of cloth, metal or the like. The discs may have a bore therethrough which may or may not have a perforated or foraminous tube core, the core, if used, preferably being shorter than the free length of the stack of discs.

In accordance with preferred practices of the invention, the fibrous material forming the batt is of synthetic origin, such as linear polyamide fibers, known as "nylon," acrylic fibers, known as "Orlon," polyester fibers, known as "Dacron," cellulose acetate, viscose fibers, and the like. Viscose fibers have proven particularly advantageous.

These and other objects, advantages, and features of the invention will be further understood from the following description and drawings which are merely exemplary.

In the drawings:

FIG. 1 shows a perspective view of a suitable ring-like disc having a corrugated outer circumferential contour for forming a layer in the cartridge filter;

FIG. 2 is a perspective, partially fragmentary, view of a filter cartridge including a perspective view of a foraminous tube, such as a paper tube, for inserting in the core of the cartridge in exploded relation;

FIG. 3 is a vertical cross-sectional view of a cartridge filter of conventional design with a cartridge, such as shown in FIG. 2, inserted therein;

FIG. 4 is a horizontal cross-sectional view of FIG. 3 along line 4—4.

Referring to the drawings, and more particularly to FIGS. 1 and 2, there is shown a filter cartridge 10 composed of a stack of superimposed ring-like filter elements 11 having the felted fibers thereof mechanically interlocked. As shown, the filter cartridge 10 is encased in a fabric bag 12 which is gathered at its upper end with a string (not shown) or can have the ends tucked into the center and held in any suitable way. It is to be understood that other types of encasements can be used and that material other than cloth can be employed. The ring-like discs 11 constituting the cartridge are shown with circumferentially spaced recesses, or convolutions, 14, such serving to form a corrugated circumferential surface. Discs 11 may be held vertically aligned, and preferably may be positioned so that the convolutions are oriented in a random manner so that the recesses are offset relative to each other, as seen in FIG. 2, the latter arrangement serving to provide more surface area than when the convolutions themselves are in exact registry. It will be understood that this particular design has been selected for purposes of illustration, and that the unit may be composed of stacks of any suitable shapes having their fibers mechanically interlocked.

As shown in FIG. 2, the cartridge is advantageously supplied with a foraminous tube core 15, such as a foraminous paper or other suitable material. This tube is preferably shorter in length than the stack of ring-like filters constituting the cartridge in its free condition before being inserted in the assembled filter. In this way, the filter cartridge can be inserted in cartridge filters of different lengths by the application of pressure of the filter casing elements to the resilient ring-like discs without the casing elements of the filter impinging upon the core of the filter cartridge.

It has been found that as a result of the mechanically interlocked fibers in the felted ring-like members, there will be more depthwise spring, or resilience, in the assembled filter cartridge than in any other known forms of textile filter cartridge construction. This characteristic provides for greater lateral permeability than is present in the usual filter cartridge and permits ready insertion of the cartridge in conventional filters.

As an example of use, FIGS. 3 and 4 show a filter cartridge of the present invention assembled in a conventional cartridge filter indicated generally at 20 and provided with its inlet 26 and outlet 27 at the top. Such a cartridge filter is especially designed for filtering liquids. The filter cartridge will be held in place by the flanges shown at 21 and will be sealed thereby. The body 22 may have the manifold cap or cover 23 held in place thereon by the usual cap nut 24 which removably engages stud 25.

As stated above, the filter cartridges hereof are made of mechanically interlocked felted synthetic fibers in the form of rink-like discs. It will be understood, however, that various combinations of synthetic fibers may be used and that synthetic fibers may be mixed with a minor amount of natural fibers and yet obtain many of the advantages of using synthetic fibers alone.

"Mechanically interlocked" is used herein to mean interlocking the fibers by needling or other similar mechanical processes in which the fibers are mechanically carried depthwise through the felt batt from which they are made. A batt, which can be referred to as a "carded batt," is prepared on a textile carding machine as is known in the manufacture of felt, such providing a plurality of layers of fibers. A plurality of barbed needles are arranged and operated so as to penetrate the thickness of the batt in such a manner as to cause fibers to move in a depthwise direction or across the layers of fiber of the batt. As the needles are withdrawn, the fibers will remain in their depthwise position where they have been carried so as to produce a mechanically interlocked felt. Both sides of the batt can be subjected to the needling treatment a plurality of times.

By employing synthetic fibers, particularly of the monofilament type, the construction will be uniform and it is possible to control accurately the size of pores so that a predetermined size of particles can be filtered out. It is possible to obtain synthetic fibers in a wide range of accurately sized fiber diameters or deniers, such as not obtainable in natural fibers. The preferred form will use monofilament fibers of one denier. The filter cartridge of the present invention has been found to have a very high solids capacity while at the same time maintaining very low pressure differential when in use and can be designed with fibers of predetermined size to effectively retain particles of a known or desired size.

It should be apparent that the details of the construction of the filter cartridge are for illustrative purposes and may be varied without departing from the spirit of the invention, or its scope, as defined in the appended claims.

What is claimed:

1. In a cartridge for cartridge filters, the combination including a plurality of ring-like filter elements having their entire exterior circumferences corrugated and each composed of synthetic fiber felt including a plurality of layers of fibers and in which a substantial portion of the fibers extend in a depthwise direction transversely across a substantial number of the layers of fibers to thereby provide a mechanically interlocked felt structure, and foraminous means holding said elements in assembled relation with the corrugations of said exterior surfaces of said elements arranged in random orientation.

2. In a cartridge for cartridge filters, the combination including a plurality of ring-like filter elements having central apertures and having their entire exterior circumferences corrugated, and each being composed of synthetic fiber felt including a plurality of layers of fibers and in which a substantial portion of the fibers extend in a depthwise direction transversely across a substantial number of the layers of fibers to thereby provide a mechanically interlocked felt structure, foraminous means holding said elements in assembled relation with the corrugations of said exterior surfaces of said elements arranged in random orientation, and foraminous hollow tube means within said central apertures of less strength than the assembled thickness of said elements.

3. In a cartridge for cartridge filters, the combination including a plurality of ring-like filter elements having central apertures and having their entire exterior circumferences corrugated, and being composed of mechanically interlocked synthetic fiber felt of substantially the same denier, foraminous means holding said elements in assembled relation and in random orientation of said corrugations, and foraminous hollow tube means within said central apertures.

References Cited in the file of this patent

UNITED STATES PATENTS

| | | |
|---|---|---|
| 2,148,708 | Orr | Feb. 28, 1939 |
| 2,426,405 | McDermott | Aug. 26, 1947 |
| 2,457,122 | Burley | Dec. 28, 1948 |
| 2,548,584 | Briggs | Apr. 10, 1951 |
| 2,672,674 | Shaw | Mar. 23, 1954 |
| 2,731,152 | Redner | Jan. 17, 1956 |
| 2,781,913 | Thompson | Feb. 19, 1957 |
| 2,800,232 | Marvel | July 23, 1957 |

FOREIGN PATENTS

| | | |
|---|---|---|
| 537,144 | Canada | Feb. 12, 1957 |

OTHER REFERENCES

"Dupont Textile Fibers Technical Information Bulletin X-64," January 1957, 10 pages.

UNITED STATES PATENT OFFICE

CERTIFICATE OF CORRECTION

Patent No. 3,064,820　　　　　　　　　　　　November 20, 1962

Thomas J. Gillick, Jr., et al.

It is hereby certified that error appears in the above numbered patent requiring correction and that the said Letters Patent should read as corrected below.

Column 4, line 20, for "strength" read -- length --.

Signed and sealed this 10th day of December 1963.

(SEAL)
Attest:

ERNEST W. SWIDER
Attesting Officer

EDWIN L. REYNOLDS

Acting Commissioner of Patents